United States Patent [19]

Etschel et al.

[11] Patent Number: 5,059,313

[45] Date of Patent: Oct. 22, 1991

[54] CONVEYOR RAKE SIEVE WITH HOOK-LIKE PLATES

[75] Inventors: Helmut Etschel; Hermann Wirth, both of Hof, Fed. Rep. of Germany

[73] Assignee: E+M Maschinenbau, Fed. Rep. of Germany

[21] Appl. No.: 499,757

[22] Filed: Mar. 27, 1990

[30] Foreign Application Priority Data

Mar. 31, 1989 [DE] Fed. Rep. of Germany ....... 3910464

[51] Int. Cl.$^5$ ............................................ B01D 33/048
[52] U.S. Cl. ...................... 210/155; 210/158; 210/232; 210/392; 210/400; 210/483
[58] Field of Search ............... 210/154, 155, 158, 159, 210/160, 161, 162, 400, 413, 526, 527, 232, 392, 407, 483, 499; 198/716; 242/47.5

[56] References Cited

U.S. PATENT DOCUMENTS

| | | | |
|---|---|---|---|
| 864,507 | 8/1907 | Brunotte | 210/162 |
| 960,613 | 6/1910 | Wunder | 210/162 |
| 1,207,376 | 12/1916 | Davidson | 210/160 |
| 1,984,891 | 12/1934 | Miick et al. | 210/159 |
| 4,132,369 | 1/1979 | Seibert | 242/47.5 |
| 4,188,294 | 2/1980 | Hagihara | 210/400 |
| 4,229,301 | 10/1980 | Roberts | 210/159 |
| 4,323,451 | 4/1982 | Hagihara | 210/159 |
| 4,853,116 | 8/1989 | Wallander | 210/155 |
| 4,921,599 | 5/1990 | Botsch | 210/155 |

Primary Examiner—Robert A. Dawson
Assistant Examiner—Joseph Drodge
Attorney, Agent, or Firm—Townsend and Townsend

[57] ABSTRACT

A separating apparatus, in particular for clarification plants, comprises a revolving strainer rake or rake sieve having a plurality of series connected rake sieve sections which each consist of adjacently disposed hook-like plates, each plate having a hook portion projecting from the front end edge, wherein the thickness of each plate decreases from the front end edge in the direction towards the rear end edge and a stationary cleaning comb adapted to engage said strainer rake sieve sections from said front edges of said hook-like plate portions.

13 Claims, 7 Drawing Sheets

CONVEYOR RAKE SIEVE WITH HOOK-LIKE PLATES

The invention relates to a separating apparatus, in particular for sewage clarification plants, and provides a strainer for removing floating debris from water. Thus the invention relates to a separating apparatus for separating solids or the like from solid-charged waste water.

The invention is based on the problem of providing a separating apparatus which permits effective removal of solids from waste water or the like and at the same time allows cleaning of the rake sieve without any danger of jamming between the rake sieve and the cleaning comb.

The rake sieve of the separating apparatus is advantageously constructed in such a manner that a variable width between the plates or bars forming the rake sieve is possible and the applicability of the separating apparatus is variable to a great extent. The gap width between the plates or bars forming the rake sieve preferably lies in the range from 3 mm to 10 mm whilst the width of the rake sieve preferably lies in the range from 30 cm to 100 cm.

The shape of the bars permits a self-cleaning of the rake sieve during operation. By the tapering form of the plates or bars jamming is effectively prevented between the bars and the cleaning comb and removal of particles adhering to the rakes ensured in simple manner.

With the cleaning apparatus in optimum manner textiles, plastic and paper, rubber waste, foodstuff waste, algae and other domestic refuse, sand and stone and industrial waste can be removed from clarification plants.

Hereinafter a preferred embodiment of the separating apparatus will be described with the aid of the drawings, wherein.

Hereinafter with reference to FIG. 1 a separating apparatus will be explained as regards its general structure. The separating apparatus comprises a revolving rake sieve or strainer rake 1 which consists of a plurality of rake sieve sections which are arranged connected together in series in chain manner and in FIG. 1 only partially illustrated and denoted by 2, 3, 4 etc. The rake sieve consisting of these rake sieve sections 2, 3, 4 etc. extends round an upper and lower reversing means comparable to a conveyor belt, the reversing means being indicated only schematically and denoted by 8 and 9. In the embodiment illustrated the reversing means 8, 9 consists in each case of sprockets. The sprockets in the embodiment described are arranged beneath the rake sieve and in engagement with a portion thereof.

The upper reversing means 8 is in drive relationship with a drive unit which is not illustrated and has for example the form of an electric motor. The rake sieve 1 can thus be moved in FIG. 1 clockwise in the manner of a conveyor belt, the lower reversing means 9 extending with a corresponding portion of the rake sieve 1 into a sewage or waste water channel or the like from which solids are to be removed. The solids are conveyed upwardly on the front side, not illustrated in FIG. 1, of the separating apparatus by means of the rake sieve and after being transported over the upper reversing means 8 discarded from the rake sieve 1 into a prepared container or the like. Beneath the upper reversing means 8, and rearwardly in the transport direction, at a predetermined distance from the reversing or deflecting means 8 there is a cleaning comb 12 which is in engagement or meshes with the rake sieve 1. The rake sieve 1 on passing the cleaning comb 12 is at least largely freed from particles pressed into the rake sieve 1 and/or adhering to the plates and the particles removed in this manner likewise drop into the container disposed beneath the reversing means 8. The sections 2, 3, etc., of the rake sieve 1 passing the cleaning comb 12 are thus at least largely freed from solid particles and are ready on entering the waste water channel to take up solid particles again and transport them upwardly in the direction towards the upper reversing means 8.

Figure 1:
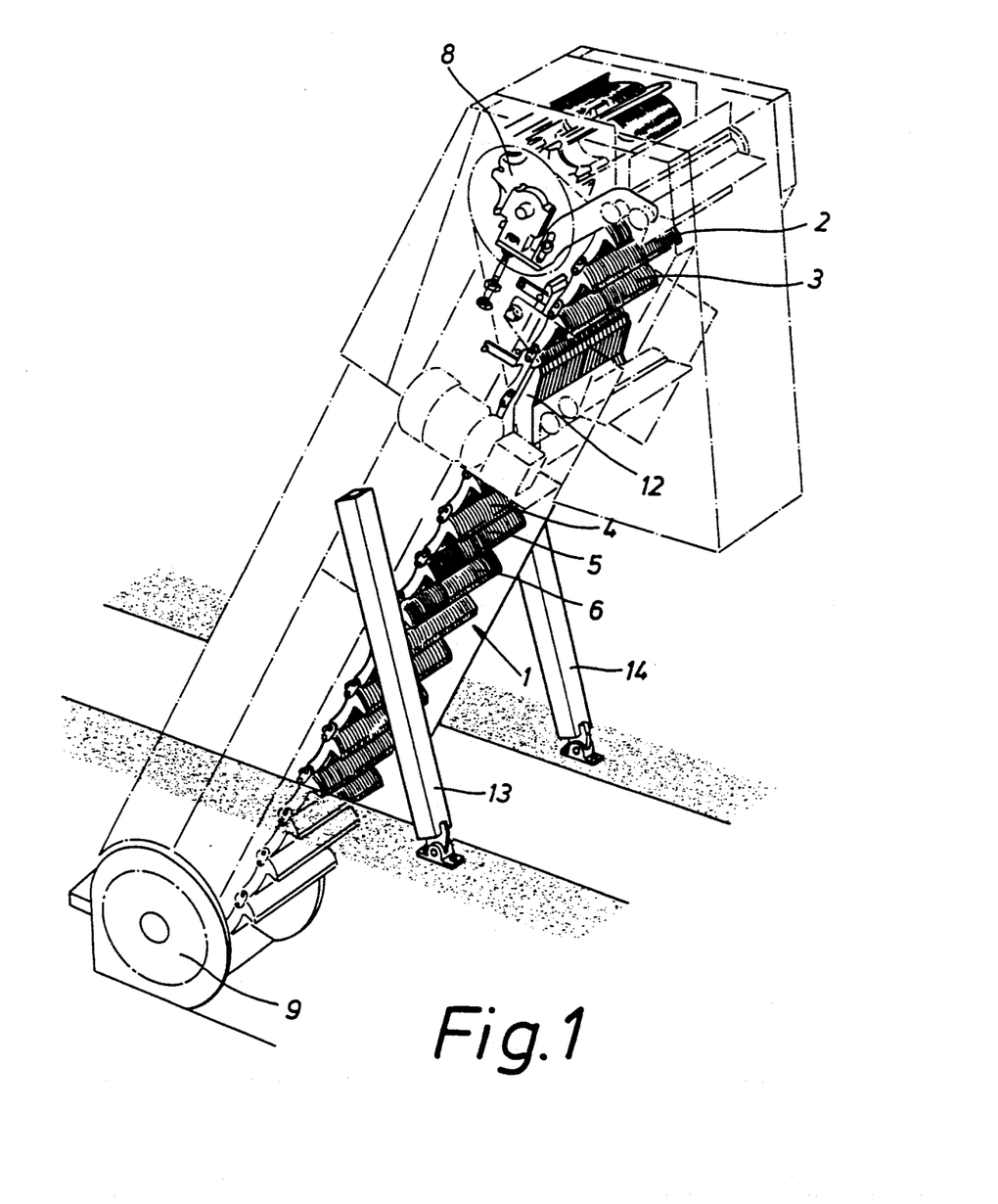
FIG. 1 is a perspective view of a separating apparatus.

To arrange the separating apparatus in the inclined position shown in FIG. 1 a support 13, 14 is provided for example laterally on each side of the separating apparatus.

The endless and circulating rake sieve 1 consists of a plurality of rake sieve sections, each section 2, 3, etc., in turn being made up in the example of embodiment illustrated in FIGS. 2 to 6 from individual bars or plates 16 and spacer elements 17 disposed therebetween. According to FIG. 6 per section a pair of hinge pins or pivot pins 18, 19 is provided, of which for example the hinge pin 18 is inserted through an upper opening 20 of all the parallel disposed plates 16 and through an opening 21 of likewise parallel disposed spacer elements 17 so that along the axis of the hinge pin 18 a plate 16 and a spacer element 17 alternate in repeated succession. Thus, between each pair of plates 16 a spacer element 17 is provided and according to FIG. 6 as chain-like link member leads to the following section and is there likewise arranged between a respective pair of plates.

Figure 6:
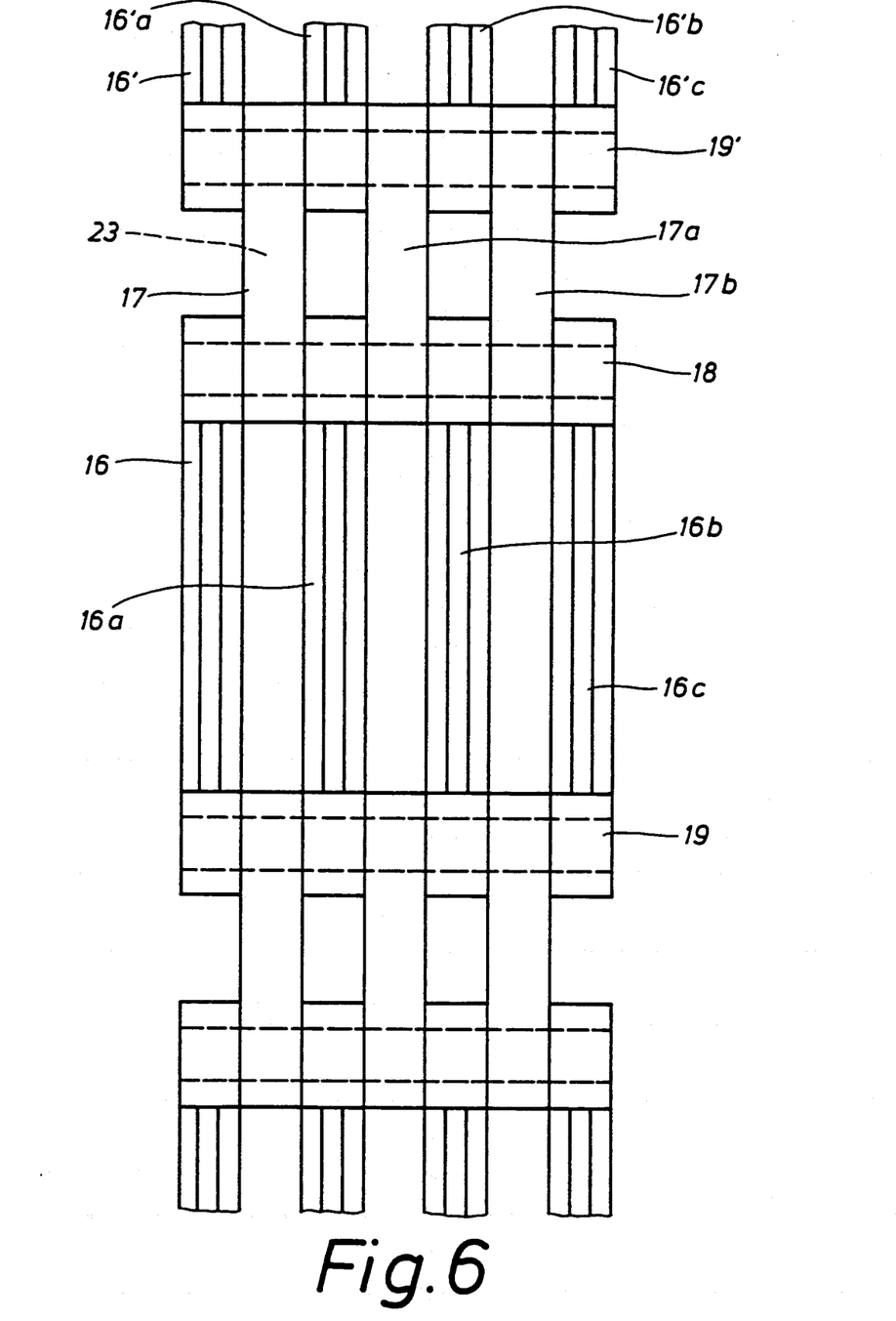
FIG. 6 is a plan view of part of the rake sieve.

In the example of embodiment shown in FIG. 6 on the hinge pin 18, seen from the left, the plate 16, spacer element 17, plate 16a, spacer element 17a, plate 16b, spacer element 17b, and plate 16c are arranged. Articulately mounted on the hinge pin 19' disposed thereabove is a plate 16', spacer element 17, plate 16a, spacer element 17a, plate 16'b, spacer element 17b and plate 16'c. The spacer elements 17, 17a, 17b represent the connecting links between the adjacent or consecutive rake sections.

Figure 4:
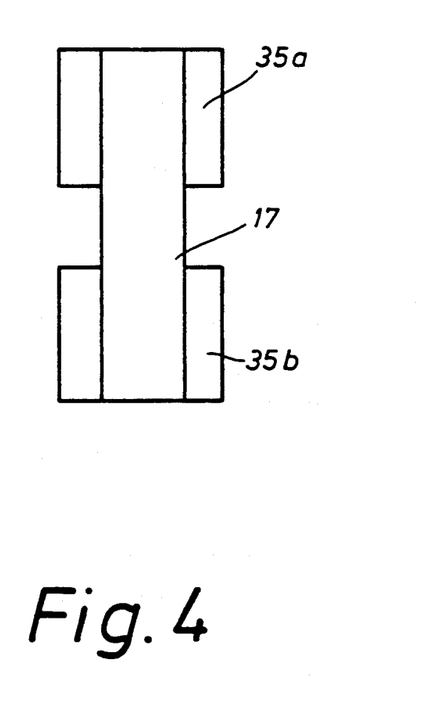
FIG. 4 is a plan view of a link member.
Figure 5:
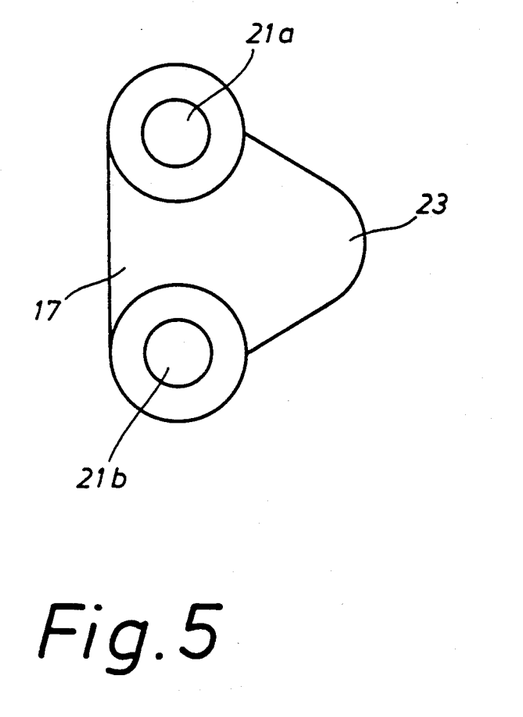
FIG. 5 is a side view of a link member corresponding to FIG. 4.

To set the rake sieve 1 in a circulating movement, on each of the spacer elements 17, 17a, etc., a driver stud 23 is formed which preferably extends tending outwardly of the plane of the spacer element 17 and points in a direction perpendicular to the transport plane and opposite to the hook portions 25 of the plates 16, still to be explained, in order to mesh with the sprockets of the reversing means 8, 9. Instead of the spacer element 17 shown in FIGS. 4 and 5 it is at least partially possible to use chain-like links which do not have the driver stud 23. In such an embodiment at least in the region of the transport sieve or sieve rake 1 moving over the sprockets of the reversing means 8, 9 spacer elements 17 of the type described in FIG. 4 are provided, thereby ensuring a drive connection to the reversing means 8 serving as drive.

Figure 2:
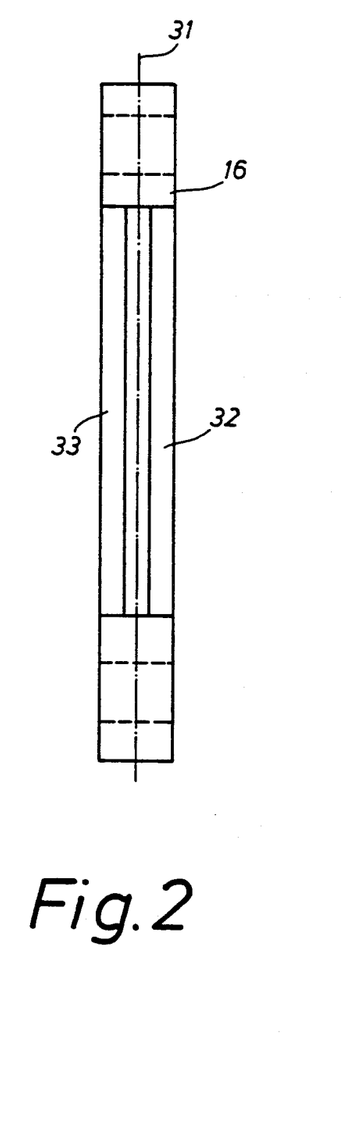
FIG. 2 shows to a greatly enlarged scale the rear view of a bar.

An essential feature of the separating apparatus described resides in the formation or configuration of the lamellae or plates 16. As FIG. 2 shows all the plates 16 have a substantially hook-shaped form and a front end edge 26, i.e. directed outwardly with respect to the separating apparatus, and a rear end edge 27. For receiving the hinge pins 18, 19 in each plate 16 an upper opening 20a and a lower opening 20b are provided between which the plate preferably has a slightly arcuate form. The thickness of the plate 16 decreases from the front end edge 26 in the direction towards the rear end edge 27 so that between the plate portions 20'a, 20'b comprising the openings 20a, 20b a tapering of the plates is defined over the length of the plate portion denoted by 30. In a preferred embodiment the thickness of the plate in the region of the end edge 27 is about 70% of the thickness of the front end edge 26 giving a tapering defined by an angle of about 1°.

The plates 16 preferably consist of plastic. With respect to their centre plane 31 (FIG. 2) the side walls 32, 33 of each plate 16 are made extending laterally inverted so that opposite the portions 20'a, 20'b having parallel side walls incisions in the form of small steps 20"a, 20"b are present.

Figure 3:
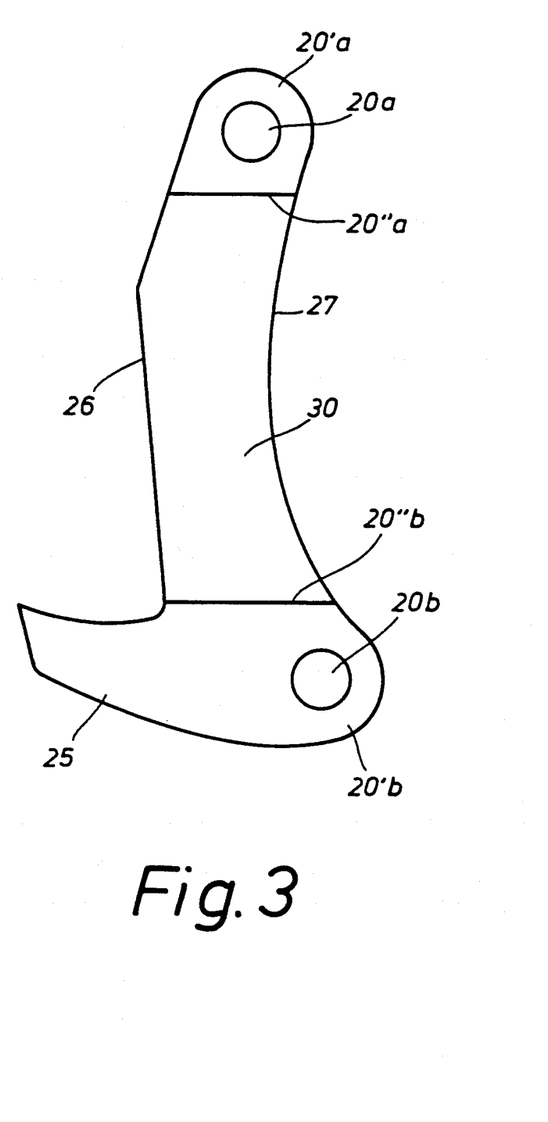
FIG. 3 is a side view of the bar according to FIG. 2.

As apparent from the illustration of FIG. 3, in contrast the thickness of the plates 16 is constant throughout in the region of the portions 20'a, 20'b, i.e. the plate 16 has the thickness corresponding to the end edge 26 and thus ensures a planar engagement with the adjacent spacer elements 17. The hook portion of the plate 16 denoted by 25 projects from the end edge 26 in a direction opposite to the end edge 27 and serves in the manner described for receiving solid particles.

The spacer elements 17 preferably have the same thickness as the plates 16 in the regions of the openings 20a, 20b, or of the end edge 26 and define the spacing between adjacent plates 16 of each section 2, 3 etc. If the space between the adjacent and parallel arranged plate 16 is to be greater than described above spacer elements 17 are employed which in the region of the openings 21a, 21b have annular flanges 35a, 35b or at least in the region of the openings 21a, 21b annular widenings.

The two openings 21a, 21b of each spacer element 17 correspond in size and form to the openings 20a, 20b of the plates 16. Said openings 21a, 21b of the spacer elements 17 have circular form and are provided for accommodating the hinge pins 18, 19.

The configuration of each plate portion 30 of each plate 16 tapering from the end edge 26 in the direction towards the end edge 27 with the cleaning comb 12 shown in FIG. 1 ensures an engagement of the cleaning comb teeth into the matching rake sieve sections and easy expulsion of solid particles stuck between the plates 16 in the direction towards the end edge 27 without any danger of jamming of the solid particles and/or the cleaning comb portions between the plates 16. The tapering configuration of the plates 16 thus substantially contributes to smooth running of the separating apparatus and to a simple troublefree cleaning of the rake sections after passing the upper reversing means 8 and the return movement into the waste water duct. The rotatable arrangement of the plates 16 on the one hand and the spacer elements 17 on the other on the hinge pins 18, 19 guarantees the necessary mobility of the entire rake sieve 1 whilst the spacer elements 17 serves at least partially simultaneously as counter drive elements with respect to the sprocket or sprockets of the reversing means 8. The plates 16 have in one embodiment an overall height of about 13 cm, whilst the hook portion 25 has a total length of about 7 cm.

Figure 7:
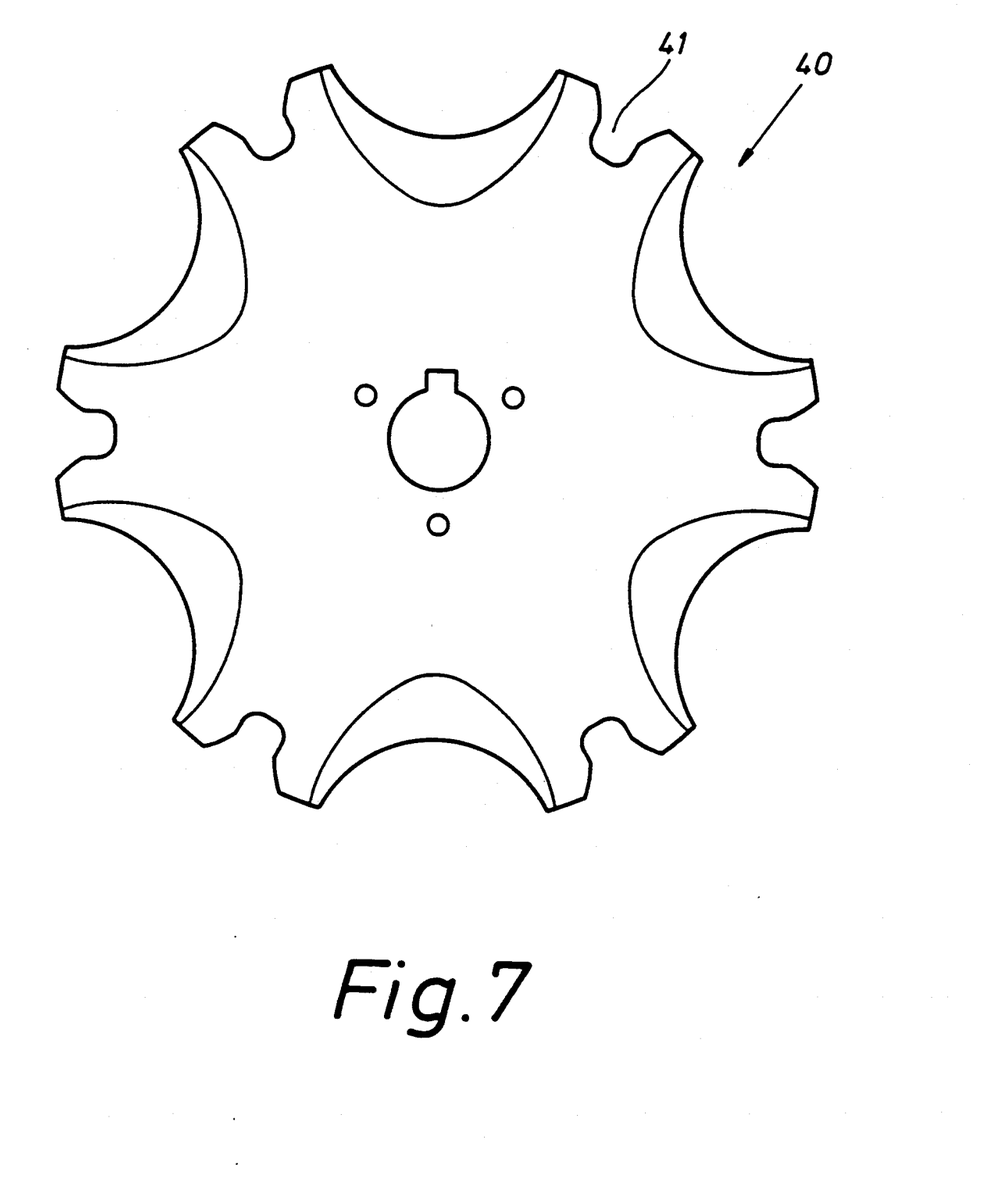
FIG. 7 is a side view of a sprocket.

FIG. 7 shows a sprocket 40 which in the region of the reversing means 8 serves for driving the rake sieve 1. Said sprocket has with respect to the embodiment described for example a width of 60 mm ensuring engagement between the sprocket 40 and for example 10 rows of parallel adjacent spacer elements 17. The sprocket 40 has depressions 41 into which the driver studs 23 of the spacer elements 17 enter. The angle between adjacent depressions 41 is made somewhat greater than the angle between the two openings 20a, 20b of the plates 16 with respect to the shaft of the sprocket 40, thereby adapting the rotation of the sprocket 40 to the plates 16 lying between the spacer elements 17.

Figure 8:
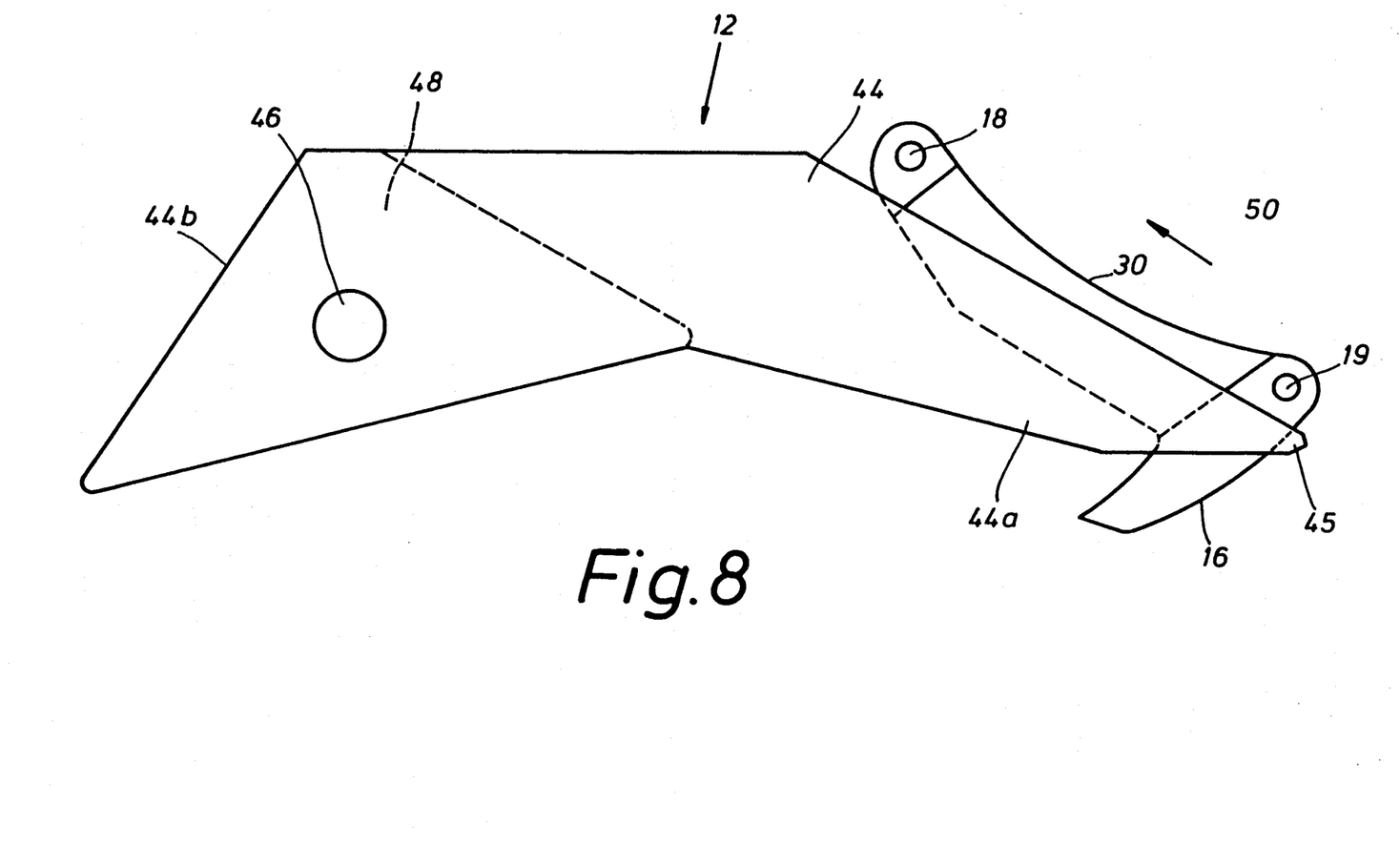
FIG. 8 is an illustration for explaining the cooperation between cleaning comb and cleaning sieve.
Figure 9A:
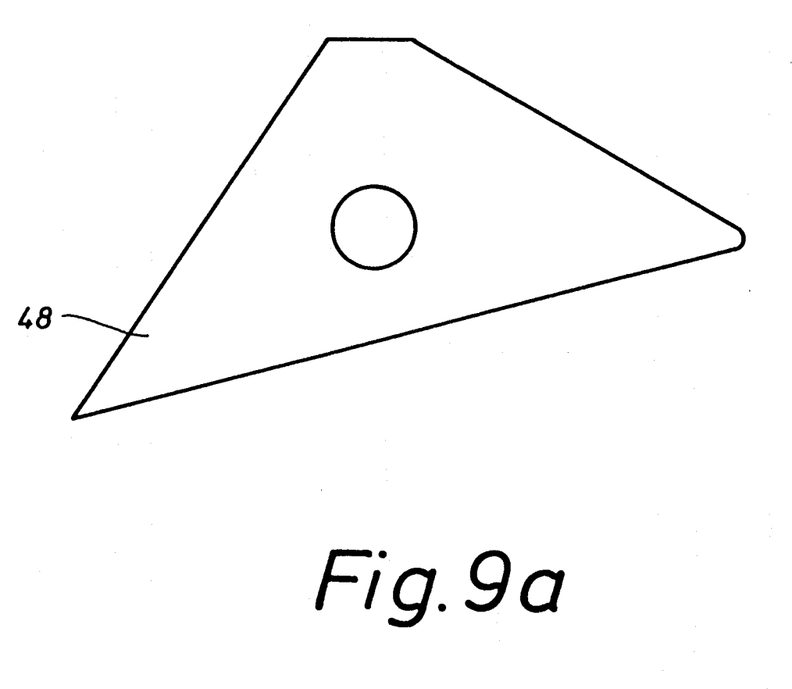
FIG. 9a and FIG. 9b are illustrations to explain a spacer element for the cleaning comb.
Figure 9B:
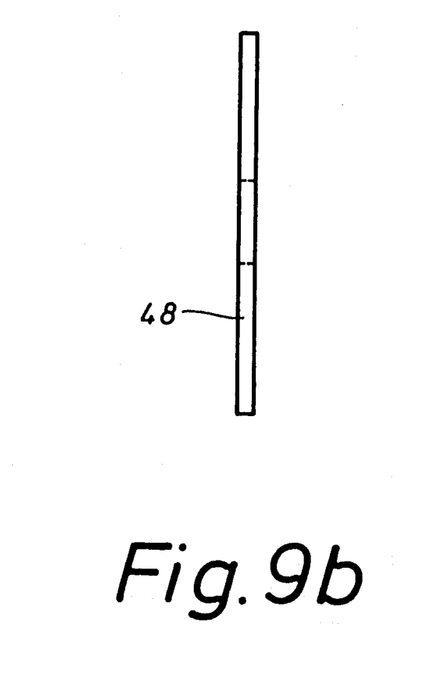

FIGS. 8 and 9a, 9b show parts of the cleaning comb 12 which meshes with the rake sieve 1 and plates 16 of each rake sieve section. Preferably, the cleaning comb consists of a plurality of individual independent comb units, this having the advantage that when teeth of the cleaning comb are damaged the entire cleaning comb need not be replaced but only one of the units making up the cleaning comb. Each unit of the cleaning comb 12 consists of a plurality of comb plates 44 of the type shown in FIG. 8. The plate 44 has substantially the form of an inverted V and comprises two legs 44a and 44b of which the leg 44a forms a tooth-shape portion 45 which engages into the gap between plate pairs. The position association between the leg 44a and the plates 16 is illustrated in FIG. 8. The leg 44b serves to fix the combing plate 44 and has a circular opening 46 serving to receive a holding pin or the like. To keep the combing plates 44 spaced apart corresponding to the arrangement of the plates 16 with the spacer elements 17, comb spacer plates 48 are provided which have substantially a triangular form, the tip of the triangle being flattened. FIG. 8 shows the position of the spacer plates 48 with respect to the adjacent combing plate 44. The thickness of the combing spacer plates 48 is greater than the thickness of the plates 16. The spacer plates 48 are likewise provided with preferably circular openings, ensuring an alternating arrangement of combing plates 44 and combing spacer plates 48 on the associated support ring pin.

It is apparent from FIG. 8 that the tooth-shaped portion 45 engages only over a portion of the width of the leg 30 of the plate 16, ensuring a movement past the annular flanges 35a, 35b during the movement indicated by the arrow 50 of the rake sieve section represented by the plate 16 in FIG. 8 past the cleaning comb 12.

The rake sieves used in the separating apparatus have a preferred width between 300 mm and 1000 mm, the gap width between the individual plates 16 lying by appropriate configuration of the spacer elements 17 preferably between 3 mm and 10 mm.

We claim:

1. A separating apparatus for sewage clarification plants comprising:
   a strainer rake having a plurality of rake sieve sections connected in series, each rake sieve section having adjacently disposed hook-like plates, each hook-like plate comprising an outward hook portion with a front edge and a rear edge, and a hook projecting from said hook portion, the thickness of said hook portion decreasing from said front edge towards the rear edge, upper and lower reversing means for guiding said strainer rake, said strainer rake being movable around said upper and lower reversing means, and a stationary cleaning comb adapted to engage said strainer rake sieve sections from said front edges of said hook-like plate portions.

2. The separating apparatus of claim 1 wherein said hook-like plates have has an upper opening defined in an upper region of the hook-like plate and a lower opening defined in a lower region of the hook-like plate, said upper and lower regions having a constant thickness, and said upper and lower openings shaped to accommodate hinge pins.

3. The separating apparatus of claim 1 further comprising a spacer element disposed between adjacent rake sieve sections, said spacer element adapted to connect said rake sieve sections.

4. The separating apparatus of claim 1, wherein said cleaning comb consists of adjacently disposed comb units adapted to engage said rake sieve sections from the front edge of said hook-like plates and extend into a space between adjacent hook-like plates of each rake sieve section.

5. A separating apparatus for sewage clarification plants comprising:

a strainer rake having a plurality of rake sieve sections connected in series, each rake sieve section having adjacently disposed hook-like plates, each hook-like plate comprising an outward hook portion with a front edge and a rear edge, and a hook projecting from said hook portion, the thickness of said hook portion decreasing from said front edge towards the rear edge, upper and lower reversing means for guiding said strainer rake, said strainer rake being movable around said upper and lower reversing means, a stationary cleaning comb having cleaning comb teeth adapted to engage said strainer rake sieve sections from said front edges of said hook-like plate portions, a spacer element disposed between adjacent rake sieve sections, said spacer element adapted to connect said rake sieve sections, and a driver stud disposed on said spacer element, said driver stud shaped to engage a driving means.

6. The separating apparatus of claim 5 wherein said hook-like plates have has an upper opening defined in an upper region of the hook-like plate and a lower opening defined in a lower region of the hook-like plate, said upper and lower regions having a constant thickness, and said upper and lower openings shaped to accommodate hinge pins.

7. The separating apparatus of claim 6 wherein said spacer element further comprises annular flanges surrounding said upper and lower openings.

8. A separating apparatus for sewage clarification plants comprising:

a strainer rake having a plurality of rake sieve sections connected in series, each rake sieve section having adjacently disposed hook-like plates, each hook-like plate comprising an outward hook portion with a front edge and a rear edge, and a hook projecting from said hook portion, the thickness of said hook portion decreasing from said front edge towards the rear edge, upper and lower reversing means for guiding said strainer rake, said strainer rake being movable around said upper and lower reversing means, a spacer element disposed between adjacent rake sieve sections, said spacer element adapted to connect said rake sieve sections, and a stationary cleaning comb comprising adjacently disposed comb units adapted to engage said strainer rake, each comb unit consisting of combing plates having at least one projecting substantially pointed end and comb spacer plates arranged between the combing plates, wherein said cleaning comb is adapted to engage said rake sieve sections from the front edges of said hook-like plate portions and extend into a space between adjacent hook-like plates.

9. A separating apparatus for sewage clarification plants comprising:

a strainer rake having a plurality of rake sieve sections connected in series, each rake sieve section having adjacently disposed hook-like plates, each hook-like plate comprising an outward hook portion, with a front edge, a rear edge, a hook projecting from a first end of said hook portion, and a mounting portion projecting from a second end of said hook portion, said mounting portion and said hook each having an opening for mounting said hook-like plate, and upper and lower reversing means for guiding said stainer rake, said strainer rake being movable around said upper and lower reversing means and a stationary cleaning comb adapted to engage said strainer rake sieve sections from said front edges of said hook-like plate portions.

10. The separating apparatus of claim 9, wherein said openings are adapted to accommodate a hinge pin, and the thickness of said mounting portion and the thickness of said hook are constant.

11. The separating apparatus of claim 10, further comprising a spacer element disposed between adjacent rake sieve sections and adapted to connect said rake sieve sections.

12. The separating apparatus of claim 9, further comprising a spacer element disposed between adjacent rake sieve sections and adapted to connect said rake sieve sections.

13. A separating apparatus for sewage clarification plants comprising a strainer rake having a plurality of rake sieve sections connected in series, each rake sieve section having adjacently disposed hook-like plates, each hook-like plate comprising an outward hook portion with a front edge and a rear edge, and a hook projecting from said hook portion, the thickness of said hook portion decreasing from said front edge towards the rear edge, upper and lower reversing means for guiding said strainer rake, said strainer rake being movable around said upper and lower reversing means, a stationary cleaning comb comprising adjacently disposed comb units adapted to engage with said strainer rake, each comb unit consisting of combing plates having at least one projecting substantially pointed end and comb spacer plates arranged between the combing plates, a spacer element disposed between adjacent rake sieve sections and adapted to connect said rake sieve sections, and wherein said cleaning comb is adapted to engage said rake sieve sections from the front edges of said hook-like plate portions and extend into a space of between adjacent plates of each rake sieve section.

* * * * *